US010375743B1

(12) United States Patent
Rathnam et al.

(10) Patent No.: US 10,375,743 B1
(45) Date of Patent: Aug. 6, 2019

(54) VOICE CHANNEL MANAGEMENT IN A COMMUNICATION SYSTEM

(71) Applicant: Republic Wireless, Inc., Raleigh, NC (US)

(72) Inventors: Sai Rathnam, Raleigh, NC (US); Justin Milam, Burgaw, NC (US); Ryan McShane, Raleigh, NC (US)

(73) Assignee: Republic Wireless, Inc., Raleigh, NC (US)

( * ) Notice: Subject to any disclaimer, the term of this patent is extended or adjusted under 35 U.S.C. 154(b) by 0 days.

(21) Appl. No.: 16/161,719

(22) Filed: Oct. 16, 2018

(51) Int. Cl.
*H04W 76/11* (2018.01)
*H04W 4/80* (2018.01)
*H04B 5/00* (2006.01)
*H04L 29/06* (2006.01)
*G10L 15/00* (2013.01)

(52) U.S. Cl.
CPC .......... *H04W 76/11* (2018.02); *H04B 5/0031* (2013.01); *H04L 63/0807* (2013.01); *H04W 4/80* (2018.02); *G10L 15/005* (2013.01)

(58) Field of Classification Search
CPC ....... H04W 76/11; H04W 76/10; H04W 4/80; H04B 5/0031; H04L 63/0807
See application file for complete search history.

(56) References Cited

U.S. PATENT DOCUMENTS

| 2014/0369232 A1* | 12/2014 | Kim | H04W 60/00 370/254 |
| 2015/0264724 A1* | 9/2015 | Yao | H04W 12/06 705/39 |
| 2017/0048385 A1* | 2/2017 | Kashimba | H04W 76/10 |

* cited by examiner

*Primary Examiner* — Kent K Krueger
(74) *Attorney, Agent, or Firm* — Gregory Stephens

(57) ABSTRACT

Techniques are disclosed for managing communication channels in a communication system that includes communication devices and a communication server. In one embodiment, first and second near field communication (NFC) equipped communication devices are put into a designated temporary channel and placed into close enough proximity to cause an NFC transaction. The NFC transaction may generate a transaction identifier that may be included in a channel establishment message sent from the first and second communication devices to the communication server. The communication server receives the transaction identifiers from the first and second NFC equipped communication devices and when they match, the communication server creates a temporary communication channel accessible to the first and second NFC equipped communication devices.

15 Claims, 5 Drawing Sheets

300

100

200

300

400

500

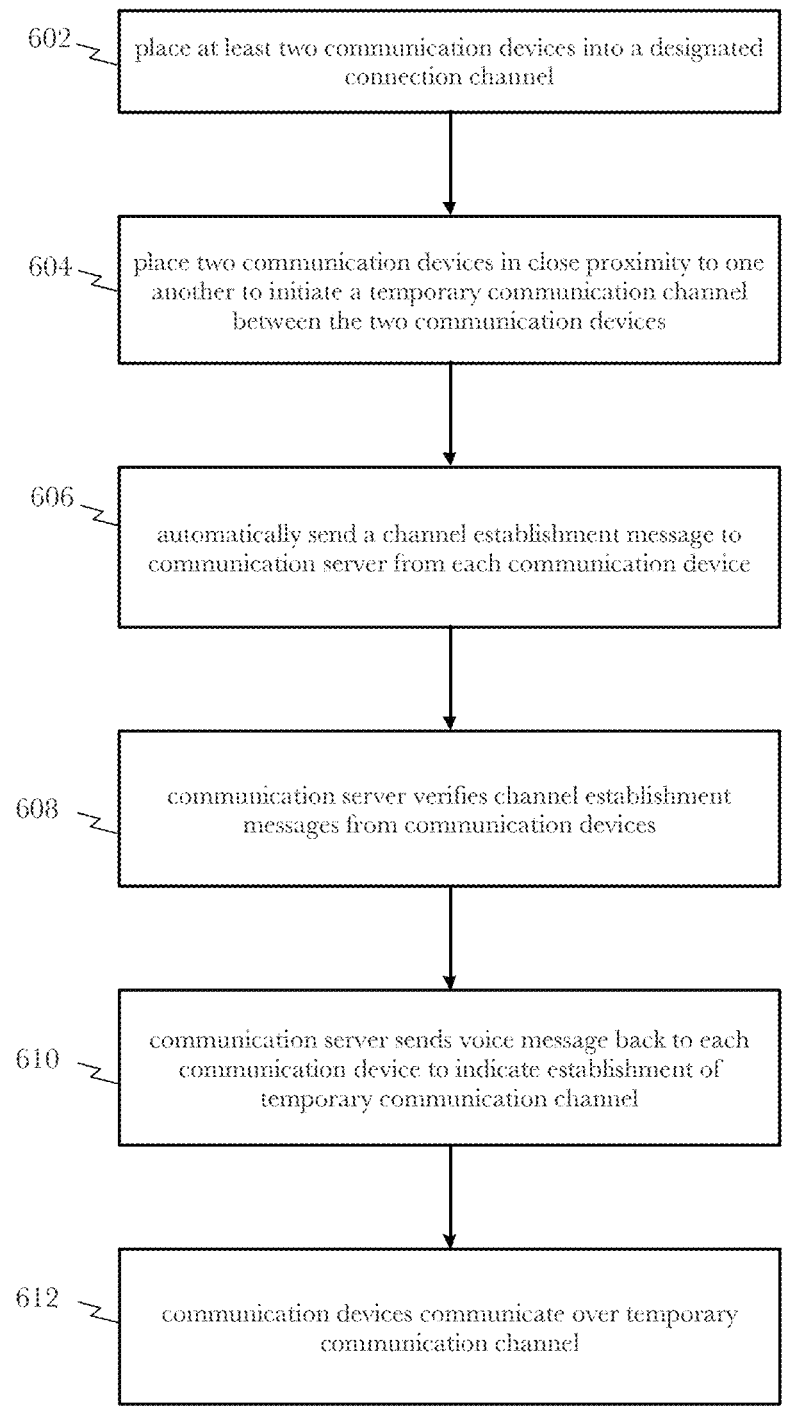

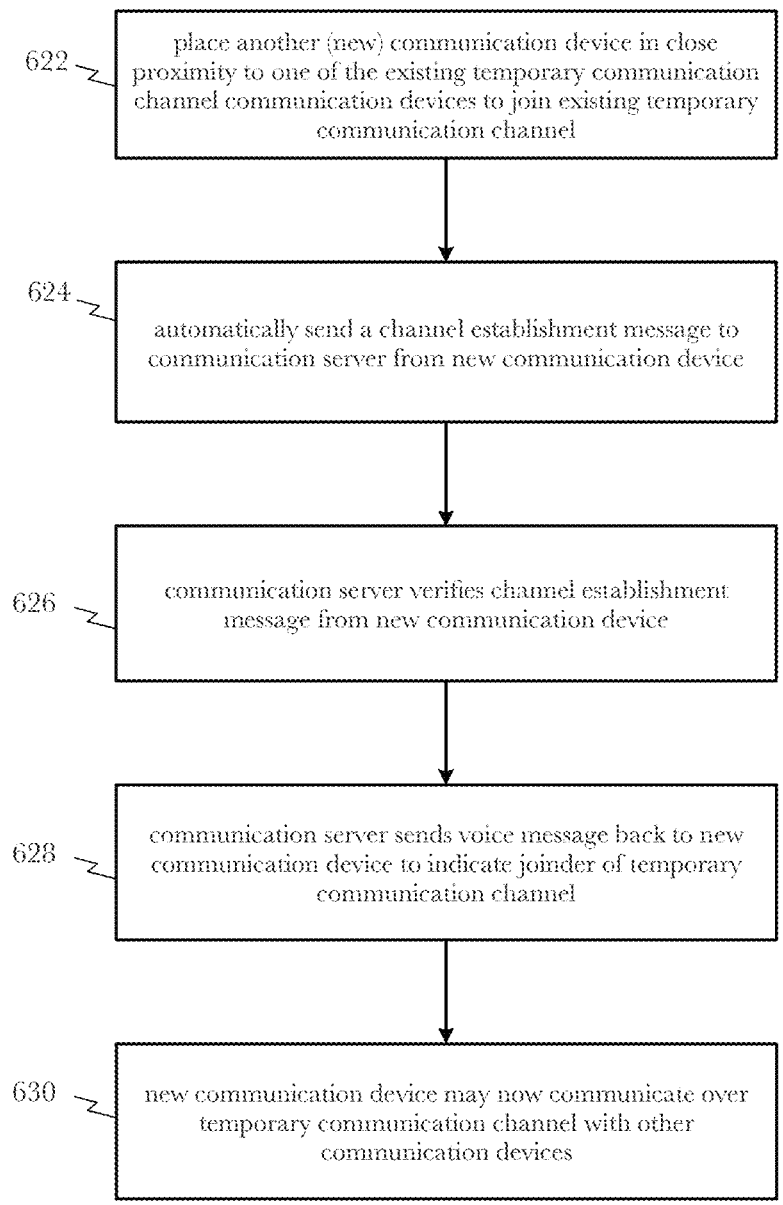

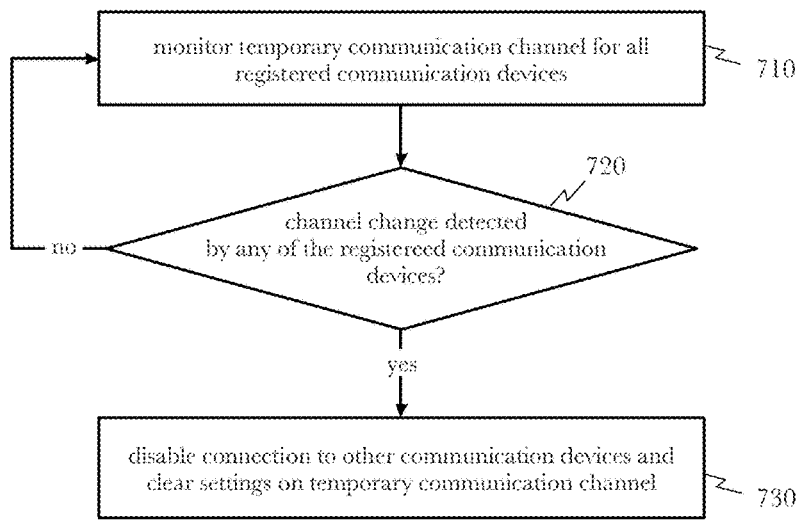
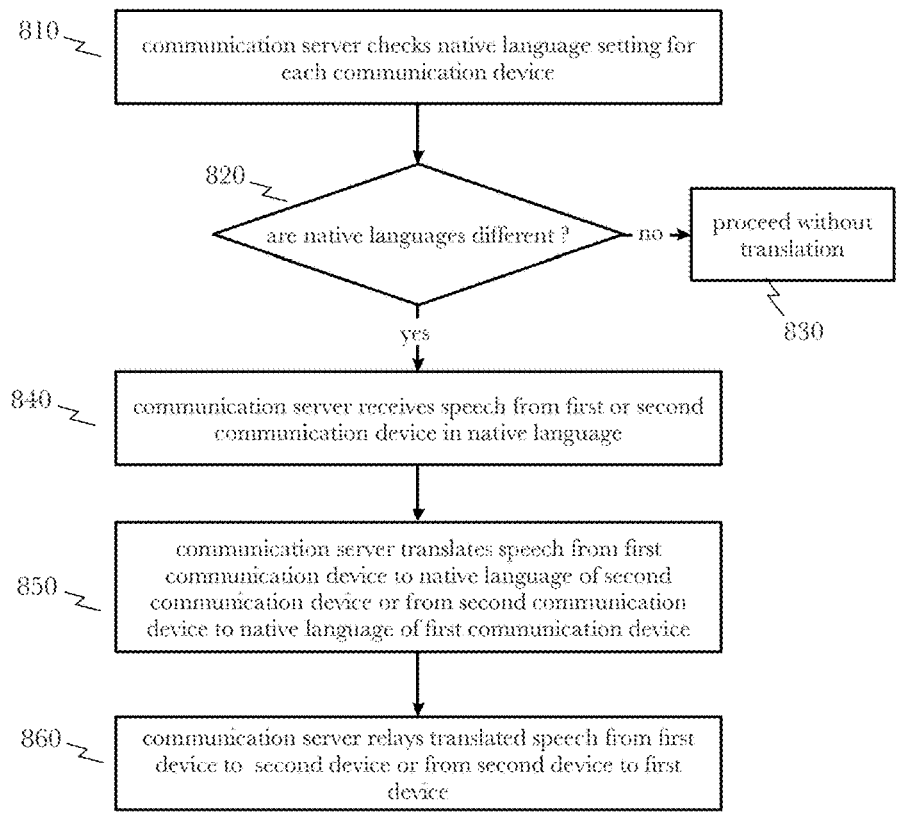

VOICE CHANNEL MANAGEMENT IN A COMMUNICATION SYSTEM

TECHNICAL FIELD

Examples described herein are generally related to techniques for providing a voice channel management in a communication system.

BACKGROUND

A new form of communication device utilizing asynchronous style communication over known wireless communication protocols such as 802.11 WiFi and cellular are starting to come to market. For instance, the Relay device by Republic Wireless® is a screenless disk-like handheld device that can enable voice communication with other Relay devices similar to the way walkie-talkies communicate. To provide a more robust communication experience, these devices need to be able to set up and manage communication channels with one another quickly and easily. Devices without screens for visual output or a plethora of buttons make channel management more difficult.

Many of these communication devices utilize an Internet Protocol (IP) communication link rather than a circuit switched communication link to exchange voice data with a communications server. The communications server mediates voice messages between and among various endpoints. The communication device(s) may wirelessly connect to an IP network over one or more wireless IP interfaces and communication links.

The IP communication link may be 802.11 based such as WiFi or may be cellular based utilizing at least one of the many cellular IP air interfaces. There are several cellular IP air interfaces already in existence that use specific frequency ranges that are suitable for use with the embodiments described herein. It should be noted that the term 802.11 encompasses all of the 802.11 versions that currently exist and may be developed. Some cellular IP air interface examples include the General Packet Radio Service (GPRS), Enhanced Data for GSM Evolution (EDGE), Evolution-Data Optimized (EV-DO), High Speed Packet Access (HSPA), High Speed Downlink Packet Access (HSDPA), Long-Term Evolution (LTE), Voice-over Long-Term Evolution (VoLTE), Wideband Code Division Multiple Access (WCDMA), Universal Mobile Telecommunications System (UMTS), and High Rate Packet Data (HRPD). Moreover, there are many more wireless IP air interfaces in the planning and/or experimental stages (e.g., 5G, light-wave based, etc.) that use the same and/or different frequencies that would also be suitable for use with the embodiments described herein.

What is needed are techniques for easily and intuitively managing communication channels for such devices.

BRIEF DESCRIPTION OF THE DRAWINGS

FIG. 6A illustrates an example of a logic flow diagram according to an embodiment of the invention.

FIG. 6B illustrates another example of a logic flow diagram according to an embodiment of the invention.

FIG. 7 illustrates yet another example of a logic flow diagram according to an embodiment of the invention.

FIG. 8 illustrates still another example of a logic flow diagram according to an embodiment of the invention.

DETAILED DESCRIPTION

Figure 1:
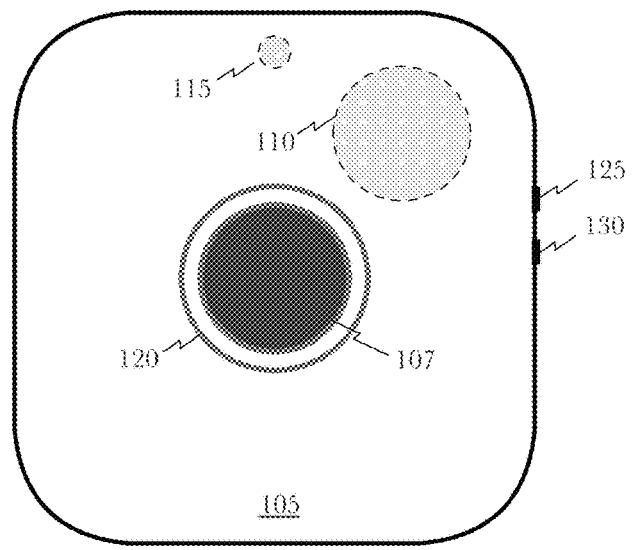
FIG. 1 illustrates a block diagram of a portable communication device according to an embodiment of the invention.

The embodiments described herein disclose systems, methods, and computer program products for establishing and managing voice communications between or among devices on an asynchronous network. The embodiments may also describe systems, methods, and computer program products for interpreting voice communications between or among devices in which the users may speak different languages on an asynchronous network. The systems and methods of the invention may be embodied in and performed by network based communications server(s) and other related components (e.g., databases), and software instructions executed by some or all of such devices and components, as will be explained in detail below. The different types of networks contemplated herein include, for example, IP based cellular mobile networks, and IP data networks, such as the Internet or other IP-based networks, including wide area networks, local area networks, and combinations thereof that include wireless 802.11 and wireless IP cellular means of access.

As used herein the term "communication device" is meant to generally indicate an end user physical device intended for, among other things, exchanging voice communication with other similar communication devices over one or more inter-connected communication networks. A communication device may be equipped with multiple RF transceivers including an 802.11 WiFi transceiver, a cellular banded transceiver, and (optionally) a Bluetooth transceiver. Other similar RF transceivers configured to use various frequency ranges may also be implemented on the communication device as they are developed. Other examples may be understood to those of ordinary skill in the art.

As used herein the term "voice communication" is meant to generally indicate any intended an asynchronous exchange of voice data among two or more communication devices. Asynchronous, in this specification, refers to a mode of communication wherein a single device controls the transmit mode at any given moment while the other devices are restricted to receive mode. Once the device in transmit mode relinquishes the channel, any other communication device may assume transmit capability.

As used herein the term "channel" is meant to generally indicate a logical connection among two or more communication devices. Communication devices must be registered with the same channel to communicate with one another.

As used herein, the term "communications server" is intended to mean an IP based computer that, among other capabilities, mediates and manages voice communications and translations among communication devices over one or more inter-connected communication networks.

As used herein, the term "communication link" is intended to mean a physical and/or logical path that connects a communication device with the IP based communications server. A communication link may be a signaling link, a media link, or both. In this context, a voice communication may be established via one or more communication links in which the IP based communications server is an endpoint for each of the communication links. The IP based communications server may then join one or more communication links together to establish a channel between or among two or more communication devices. The IP based communications server may be hosted within an IP network accessible to the Internet.

References herein to a communication device capable of connecting to or communicating via a mobile radio access network (MRAN) refer to a communication device equipped with a cellular transceiver for wireless communication with basestations for purposes of accessing cellular IP data services. Similarly, references herein to a communication device capable of connecting to or communicating via an IP data network refer to a communication device equipped with a transceiver for wireless communication (e.g., 802.11 WiFi) with a router or other IP data network access point.

FIG. 1 illustrates a block diagram 100 of a portable communication device 105 according to an embodiment of the invention. From an external user point of view, the communication device 105 may include an input button 107 generally used to put the communication device 105 into a transmission mode. Transmission mode may indicate the user is speaking a voice communication that is intended to be relayed to the other communication devices subscribed to the active channel. A microphone 115 picks up the speech to be transmitted while a speaker 110 outputs or plays back received audio such as voice communications that are received. A light emitting diode (LED) 120 mechanism in the shape of a ring surrounding the input button 107 may be implemented as a mechanism of providing certain types of visual feedback. A pair of buttons 125, 130 may also be included. For instance, button 125 may serve as both a power button and a channel switching button depending on the way the user actuates the button. A long press may toggle the communication device between power-on and power-off while short presses may toggle the communication device through a series of channels. The aforementioned description of the communication device is illustrative only. On of ordinary skill in the art may vary the design of the communication device without altering or affecting the claimed patentable elements, steps, or processes made herein.

Figure 2:
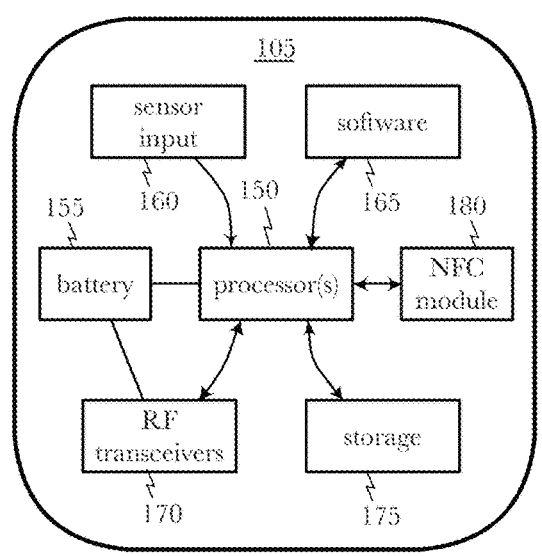
FIG. 2 illustrates a portable communication device according to an embodiment of the invention.

FIG. 2 illustrates a portable communication device 105 according to an embodiment of the invention. From an internal component point of view, the communication device 105 may include one or more processors 150 for executing instructions, processing data, and controlling the functions of the communication device 105. A sensor input component 160 may receive and send signals and/or data between the processor(s) 150 and the various user input/output components such as the microphone 115, speaker 110, LED 120, and buttons 125, 130. A generalized software component 165 includes computer code for controlling and executing the various functions of the communications device 105. The software component 165 may also represent downloaded or pre-loaded software applications. The software component may be stored in storage component 175 which may be one or both of random access memory (RAM) or Read-only memory (ROM). The storage component 175 may also encompass mechanisms like subscriber identity module (SIM) cards. The communication device 105 is powered by a power source such as, for instance, a battery 155 coupled with the components needing power like the processor(s) 150 and RF transceivers 170, and NFC module 180. The RF transceivers 170 may be embedded into chip sets for cellular communication, 802.11 WiFi communication, and Bluetooth communication. The NFC module 180 provides a data exchange capability between two communication devices 105 for various purposes including the ability to exchange general identification information and native language data.

Figure 3:
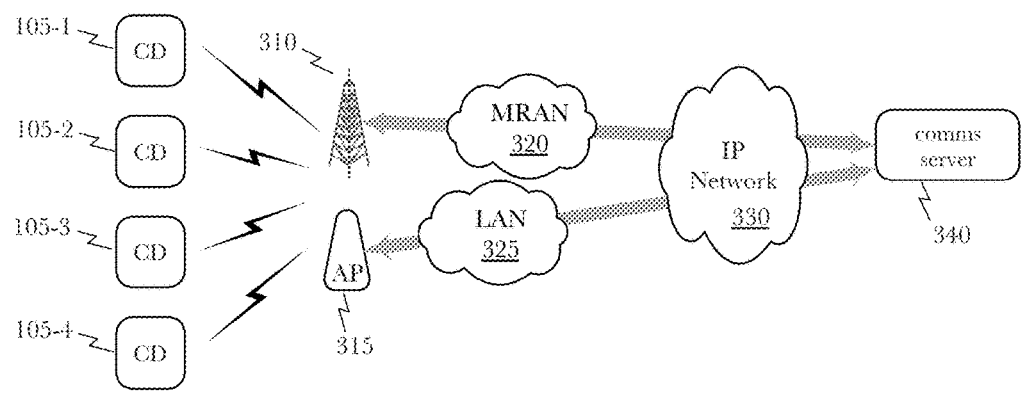
FIG. 3 illustrates an example block diagram for a networked environment.

FIG. 3 illustrates an exemplary networked environment 300 for implementing certain exemplary embodiments described herein. The networked environment 300 may include multiple distinct inter-connected networks such as, for instance, a large scale internet protocol (IP) network (e.g., the Internet) 330, one or more IP based local area networks or wide area networks (LANs/WANs) 325 including 802.11 wireless access point(s) 315, and one or more mobile radio access networks (MRANs) 320 accessible via a cellular basestation tower(s) 310.

It should be noted that alternative wireless IP based networks (not shown) that do not operate over the frequency spectrum typically associated with 802.11 (e.g., WiFi) or cellular may be implemented. One example of such an alternate wireless IP network may be WiMAX (e.g., 802.16). Other examples may include, but are not limited to, networks utilizing television whitespace frequencies and other unlicensed (or yet to be licensed) frequencies, including, but not limited to, those under consideration for 5G implementations. These may include wireless networks operating within a frequency range of 100 MHz and 700 MHz, 900 MHz industrial, scientific, and medical (ISM) bands, and wireless networks operating within a frequency range of 3.5 GHz and 3.7 GHz, and anything at or above 5 GHz including light-wave based transmission systems.

The MRANs 320 and the LANs 325 each have backhaul IP connectivity to the Internet 330 that provide connectivity with a communications server 340. In certain embodiments, MRANs 320 include cellular networks or portions of cellular networks based on a variety of circuit switched and/or IP data protocols such as, but not limited to, Global System for Mobile Communications (GSM), Code Division Multiple Access (CDMA), General Packet Radio Service (GPRS), Enhanced Data for GSM Evolution (EDGE), Evolution-Data Optimized (EV-DO), High Speed Packet Data (HSPD), High Speed Downlink Packet Access (HSDPA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD) and/or any other existing or developed/developing cellular network IP standards—e.g., 5G.

In addition to circuit switched radio transmission schemes, each MRAN 320 may also provide communication devices 105-1, 105-2, 105-3, 105-4 with wireless IP based data access to the Internet 330 using one of the aforementioned cellular IP protocols. For illustration only, four (4) communication devices 105-1, 105-2, 105-3, 105-4 have been illustrated. The architecture of FIG. 3 and the broader description herein may support any number of communication devices. Similarly, an IP access point 315 may provide wireless connectivity for communication devices 105-1, 105-2, 105-3, 105-4 to the Internet 330 using any of the 802.11 WiFi standards and/or any other type of IP based connectivity standard.

In operation, communication device(s) 105-1, 105-2, 105-3, 105-4 may establish a connection with and register with the communications server 340. The connection may comprise one or more communication links utilizing LAN 325 or MRAN 320. Once established, the communication device(s) 105-1, 105-2, 105-3, 105-4 may exchange data, including voice communications, with the communication server 340.

Communication server 340 manages a plurality of communication device(s) 105-1, 105-2, 105-3, 105-4 and includes, among other things, the capability to establish and manage private communication channels between and among multiple communication devices 105-1, 105-2, 105-3, 105-4.

In one embodiment, two or more communication devices (e.g., 105-1, 105-2) may like to establish a communication channel with one another. One such method of establishing a communication channel may utilize the NFC module 180 of each communication device 105-1, 105-2.

Figure 4:
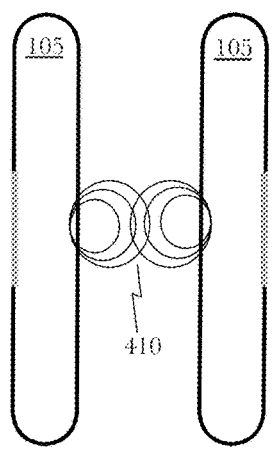
FIG. 4 illustrates a pair of portable communication devices in a close proximity data exchange orientation according to an embodiment of the invention.

FIG. 4 illustrates a pair of portable communication devices 105-1, 105-2 in a close proximity near field communication (NFC) data exchange orientation 410 according to an embodiment of the invention. NFC is a set of standards for portable devices. It allows them to establish peer-to-peer radio communications, passing data from one device to another by putting them very close to one another. NFC is a means of sending and receiving data over radio waves. In that sense it is similar to Wi-Fi or Bluetooth, but unlike those protocols, NFC can be used to induce electric currents within passive components as well as just send data. NFC's data-transmission frequency is around 13.56 MHz and can typically transmit data at 106, 212 or 424 Kbps (kilobits per second). NFC devices can be full-duplex meaning they are able to receive and transmit data at the same time.

In one embodiment, when two communication devices 105-1, 105-2 are brought within close enough proximity with one another, an NFC exchange 410 occurs in which each communication device 105-1, 105-2 reads or receives an identity token of the other communication device 105-1, 105-2. Each communication device 105-1, 105-2 may then upload this data to the communication server 340. The communication server 340 may then associate the two communication devices 105-1, 105-2 with one another and establish a private communication channel between them.

Figure 5:
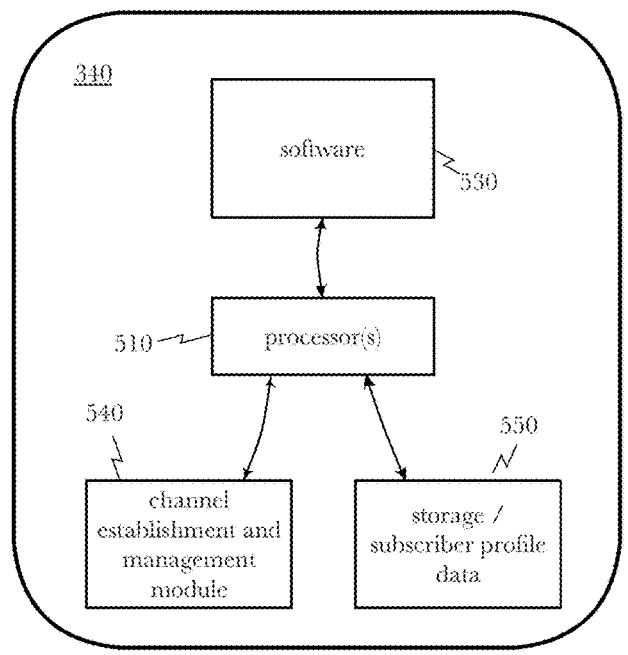
FIG. 5 illustrates a block diagram of a communications server according to an embodiment of the invention.

FIG. 5 illustrates a block diagram 500 of a communications server 340 according to an embodiment of the invention. The communications server 340 may include one or more processor(s) 510 coupled with a data storage/subscriber profile data component 550 comprised of subscriber profile data. The subscriber profile data may include device identification information linking particular communication devices 105-1, 105-2, 105-3, 105-4 to particular subscribers and/or accounts of subscribers. The subscriber profile data may further include a field or record identifying the native or preferred language associated with the communication device 105-1, 105-2, 105-3, 105-4. In addition, one account may have multiple communication devices 105-1, 105-2, 105-3, 105-4 associated therewith. The storage component 550 may also store software applications 530.

One such software module may be characterized as a channel establishment and management module 540. The channel establishment and management module may be responsible for setting up, managing, and tearing down communication channels among communication devices 105-1, 105-2, 105-3, 105-4. Once a channel is established among two or more communication devices 105-1, 105-2, 105-3, 105-4, those communication devices 105-1, 105-2, 105-3, 105-4 may send and receive voice communications to one another over the established channel.

The communication server 340 may receive voice communications from a particular communication device (e.g., 105-1) in a first language and translate the voice communication into a second language. Once translated, the communication server 340 may forward the translated voice communication to the other communication device(s) 105-2, 105-3, 105-4 in the channel. Speech translation may be invoked during channel establishment due to the discovery by the communication server 340 that the communication devices 105-1, 105-2, 105-3, 105-4 do not share the same native language. For instance, during channel establishment, one of the items of data sent to the communication server may be an indication of the native language associated with the particular communication device 105-1, 105-2, 105-3, 105-4 which may be pre-set when first activating the communication device 105-1, 105-2, 105-3, 105-4 on the network. The language identifier may also be changed by editing the subscriber's profile data stored in the communication server 340. For instance, the language identifier may be changed by a companion application linked with the communication device 105-1, 105-2, 105-3, 105-4 or through a recognizable voice command given to the communication device 105-1, 105-2, 105-3, 105-4 by the subscriber. The native language associated with a communication device 105-1, 105-2, 105-3, 105-4 informs the communication server 340 the language the communication device 105-1, 105-2, 105-3, 105-4 should output any voice communication with other communication devices 105-1, 105-2, 105-3, 105-4 or audio sources.

FIGS. 6-8 illustrate examples of logic flow diagrams according to embodiments of the invention. The logic flows may be representative of some or all of the operations executed by one or more embodiments described herein. Further, the logic flows may performed by circuitry and one or more components discussed herein. Moreover, logic flows may be performed in conjunction with one or more other logic flows discussed herein and lists particular steps occurring in a particular order. However, embodiments are not limited in this manner and any step may occur in any order. Further, steps of the logic flows may not be dependent upon one another and as such particular steps in the logic flows may not occur.

FIG. 6A illustrates an example logic flow diagram 600 according to an embodiment of the invention. Logic flow diagram 600 may facilitate the creation of a communication channel among two or more communication devices 105-1, 105-2, 105-3, 105-4 on a temporary and ad-hoc basis using an NFC assisted technique. In step 602, at least two communication devices 105-1, 105-2 may be placed into a pre-defined or reserved connection channel. The NFC equipped communication devices 105-1, 105-2 may then be placed in sufficient proximity to one another such as back to back in step 604 to initiate a process for creating a temporary communication channel between the two communication devices 105-1, 105-2. In some instances, the communication devices 105-1, 105-2 may be bumped together to ensure the NFC proximity requirement is satisfied. In one embodiment, the NFC coupling may generate the same random token for each communication device 105-1, 105-2. Once an NFC coupling is made between the communication devices 105-1, 105-2, each communication device 105-1, 105-2 may automatically send a channel establishment message to the communication server 340 at step 606. In an embodiment, the channel establishment message may include the randomly generated token. Once the communication server 340 receives the channel establishment message from each communication device 105-1, 105-2, it may verify them prior to setting up the temporary communication channel at step 608. In an embodiment, the communication server 340 may compare the random tokens from each received channel establishment message. If the random tokens are identical, the channel establishment messages are validated and the communication server 340 creates the temporary channel between the two communication devices 105-1, 105-2. If the random tokens do not match, the temporary communication channel may not be established. If the communication server 340 does create the temporary channel between the two communication devices 105-1, 105-2, it will send an acknowledgment voice message back to each communication device 105-1, 105-2 to indicate establishment of the channel and that it is ready to use at step 610. The communication devices 105-1, 105-2 may then communicate with one another over the temporary communication channel in step 612.

FIG. 6B illustrates an example logic flow diagram according to an embodiment of the invention. Sometimes, an additional communication device 105-3 may wish to join the just established temporary private communication channel. In such cases, the additional (i.e., new) communication device 105-3 need only may be placed in sufficient NFC proximity to another communication device 105-1, 105-2 already in the private communication channel to join in step 622. The new communication device 105-3 may then automatically send a channel establishment message to the communication server 340 at step 624. In an embodiment, the channel establishment message also includes the token generated originally or an entirely new token may be generated. Once the communication server 340 receives the channel establishment message from the new communication device 105-3, it may verify it prior to joining it to the temporary communication channel at step 626. In an embodiment, the communication server 340 may compare the token from in the channel establishment message received from the new communication device 105-3 to see if it matches the token provided in the original channel establishment messages. Alternatively, new random tokens may have been generated and sent by the new communication device 105-3 and the communication device 105-1, 105-2 already in the temporary communication channel. In either case, if the random tokens are identical, the channel establishment messages are validated and the communication server 340 joins the new communication device 105-3 to the temporary channel. If the random tokens do not match, the new communication device 105-3 is not permitted to join the temporary communication channel. If the communication server 340 does permit the new communication device 105-3 to join the temporary channel, it will send an acknowledgment voice message back to the new communication device 105-3 to indicate establishment of the channel and that it is ready to use at step 628. All the communication devices 105-1, 105-2, 105-3 may then communicate with one another over the temporary communication channel in step 630.

FIG. 7 illustrates an example logic flow diagram 700 according to an embodiment of the invention. Because the temporary communication channel established among two or more communication devices 105-1, 105-2, 105-3, 105-4 as described above is temporary, there may be a mechanism or condition that disables the temporary communication channel for a communication device 105-1, 105-2, 105-3, 105-4. In one embodiment, the communication server 340 may monitor the temporary communication channel on all the communication devices 105-1, 105-2, 105-3 in the channel at step 710. For instance, the communication server 340 may determine that each communication device 105-1, 105-2, 105-3 remains 'tuned to' or 'camped on' the recently created temporary communication channel. The communication server 340 may detect when any of the communication devices 105-1, 105-2, 105-3 tune out of the temporary communication channel at step 720. Upon detecting a channel change in step 720 for a particular communication device (e.g., 105-1), the communication server 340 may disable the connection to the other communication devices 105-2, 105-3 and clear any settings associated with the temporary communication channel for communication device 105-1 at step 730.

FIG. 8 illustrates an example logic flow diagram 800 according to an embodiment of the invention. In another embodiment, the communication server may act as an interpreter between two communication devices 105-1, 105-2 translating speech in a first language to speech in a second language. When two communication devices 105-1, 105-2 are subscribed to or 'in' the same communication channel, the communication server 340 may first determine the native language of each communication device 105-1, 105-2 at step 810. For instance, each communication device 105-1, 105-2 may include a native language token or identifier that is known to the communication server 340. This identifier may be changed by the subscriber by, for instance, editing a web-based profile for the communication device 105-1, 105-2 or by giving the communication device 105-1, 105-2 a recognized verbal instruction to change the language identifier. In another embodiment, the communication server 340 may automatically detect the language being spoken by a communication device and consider it to be the native language. There are existing products and code bases that enable language recognition which may be incorporated into the communication server 340.

When two communication devices 105-1, 105-2 are in communication with one another, the communication server 340 may determine if the native languages for each communication device 105-1, 105-2 are different at decision block 820. If not, the communication server 340 may broker the communication between the communication devices 105-1, 105-2 over the communication channel without needing to translate anything at step 830. However, if the communication server 340 determines the native languages for each communication device 105-1, 105-2 are different at decision block 820, the communication server 340 may then translate audio between the two communication devices 105-1, 105-2. In one embodiment, the communication server 340 may receive speech from the first and second communication devices 105-1, 105-2 in one language at step 840. The communication server 340 may then translate the speech received to the native language of the communication device 105-1, 105-2 for which the speech was intended at step 850. The communication server 340 may then relay the translated speech to the other communication device 105-1, 105-2 at step 860. In this manner, the communication server 340 acts as a Rosetta Stone of sorts translating the speech intended for a communication device 105-1, 105-2 into the native language of that communication device 105-1, 105-2.

Additional communication devices 105-3, 105-4 with different native languages may also be joined to the channel. The communications server 340 may then translate to all languages as needed. For instance, suppose communication device 105-1 'speaks' English while communication device 105-2 speaks Spanish, communication device 105-3 speaks French, and communication device 105-4 speaks German. A conversation may ensue where the communication device 105-1 transmitting sends its speech to the communication server 340 where it may be translated into the other three languages and relayed to those communication devices 105-2, 105-3, 105-4 in the appropriate language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The invention claimed is:

1. A method of managing communication channels in a communication system that includes near field communication (NFC) capable communication devices and a communication server, the method comprising:
   causing an NFC transaction when a first and a second NFC equipped communication device are placed into close enough proximity of one another, the NFC transaction comprising generating a transaction identifier that is temporarily available to the first and the second NFC equipped communication devices;
   sending a first channel establishment message from the first NFC equipped communication device to the communication server, the first channel establishment message comprising the transaction identifier;
   sending a second channel establishment message from the second NFC equipped communication device to the communication server, the second channel establishment message comprising the transaction identifier;
   comparing, at the communication server, the transaction identifier received from the first NFC equipped communication device in the first channel establishment message with the transaction identifier received from the second NFC equipped communication device in the second channel establishment message; and
   when the transaction identifiers from the first and the second NFC equipped communication devices are identical, establishing a temporary communication channel to allow voice communication between the first and the second NFC equipped communication devices.

2. The method of claim 1, comprising:
   sending an acknowledgment message from the communication server back to the first and the second NFC equipped communication devices to indicate establishment of the temporary communication channel.

3. The method of claim 1, the transaction identifier comprising a randomly generated token.

4. The method of claim 1, the transaction identifier comprising a device identifier for the first NFC equipped communication device and a device identifier for the second NFC equipped communication device.

5. The method of claim 1, comprising:
   monitoring the temporary communication channel for each communication device communicating on the temporary communication channel;
   detecting when a communication device communicating on the temporary communication channel leaves the temporary communication channel; and
   disabling any communication device that leaves the temporary communication channel from communicating any further on the temporary communication channel.

6. A communication system configured to manage communication channels, comprising:
   a first near field communication (NFC) equipped communication device;
   a second NFC equipped communication device; and
   a communication server;
   wherein
   the first and second NFC equipped communication devices being wirelessly communicable with the communication server and comprising one or more processors configured to execute instructions to create a temporary communication channel, the instructions to:
      cause an NFC transaction when the first and second NFC equipped communication devices are placed into close enough proximity of one another, the NFC transaction comprising generating a transaction identifier that is temporarily available to the first and the second NFC equipped communication devices;
      send a first channel establishment message from the first NFC equipped communication device to the communication server, the channel establishment message comprising the transaction identifier;
      send a second channel establishment message from the second NFC equipped communication device to the communication server, the second channel establishment message comprising the transaction identifier; and
   the communication server, comprising one or more processors configured to execute instructions to create a temporary communication channel, the instructions to:
      receive the first and the second channel establishment messages from the first and the second NFC equipped communication devices;
      compare the transaction identifier received from the first NFC equipped communication device in the first channel establishment message with the transaction identifier received from the second NFC equipped communication device in the second channel establishment message; and
      when the transaction identifiers from the first and the second NFC equipped communication devices are identical, establish a temporary communication channel to allow voice communication between the first and the second NFC equipped communication devices.

7. The communication system of claim 6, comprising:
   sending an acknowledgment message from the communication server back to the first and the second NFC equipped communication devices to indicate establishment of the temporary communication channel.

8. The communication system of claim 6, the transaction identifier comprising a randomly generated token.

9. The communication system of claim 6, the transaction identifier comprising a device identifier for the first NFC equipped communication device and a device identifier for the second NFC equipped communication device.

10. The communication system of claim 6, comprising:
    monitoring the temporary communication channel for each communication device communicating on the temporary communication channel;
    detecting when a communication device communicating on the temporary communication channel leaves the temporary communication channel; and
    disabling any communication device that leaves the temporary communication channel from communicating any further on the temporary communication channel.

11. Non-transitory computer-readable mediums comprising a plurality of instructions that when executed enable processing circuitry to execute instructions to manage communication channels in a communication system, the instructions to:

cause an NFC transaction when a first and a second NFC equipped communication device are placed into close enough proximity of one another, the NFC transaction comprising generating a transaction identifier that is temporarily available to the first and the second NFC equipped communication devices;

send a first channel establishment message from the first NFC equipped communication device to the communication server, the channel establishment message comprising the transaction identifier;

send a second channel establishment message from the second NFC equipped communication device to the communication server, the second channel establishment message comprising the transaction identifier;

receive the first and the second channel establishment messages from the first and the second NFC equipped communication devices;

compare the transaction identifier received from the first NFC equipped communication device in the first channel establishment message with the transaction identifier received from the second NFC equipped communication device in the second channel establishment message; and when the transaction identifiers from the first and the second NFC equipped communication devices are identical, establish a temporary communication channel to allow voice communication between the first and the second NFC equipped communication devices.

12. The non-transitory computer-readable storage mediums of claim 11, the plurality of instructions that when executed enable the processing circuitry to:

send an acknowledgment message back to the first and the second NFC equipped communication devices to indicate establishment of the temporary communication channel.

13. The non-transitory computer-readable storage mediums of claim 11, the transaction identifier comprising a randomly generated token.

14. The non-transitory computer-readable storage mediums of claim 11, the transaction identifier comprising a device identifier for the first NFC equipped communication device and a device identifier for the second NFC equipped communication device.

15. The non-transitory computer-readable storage mediums of claim 11, the plurality of instructions that when executed enable the processing circuitry to:

monitor the temporary communication channel for each communication device communicating on the temporary communication channel;

detect when a communication device communicating on the temporary communication channel leaves the temporary communication channel; and disable any communication device that leaves the temporary communication channel from communicating any further on the temporary communication channel.

* * * * *